United States Patent
Steele

(10) Patent No.: US 8,978,827 B2
(45) Date of Patent: Mar. 17, 2015

(54) WIND DRIVEN AUTOMATIC LUBRICATOR FOR A MOTORCYCLE DRIVE CHAIN

(71) Applicant: Michael Shawn Steele, LaPlata, MD (US)

(72) Inventor: Michael Shawn Steele, LaPlata, MD (US)

(*) Notice: Subject to any disclaimer, the term of this patent is extended or adjusted under 35 U.S.C. 154(b) by 304 days.

(21) Appl. No.: 13/716,133

(22) Filed: Dec. 15, 2012

(65) Prior Publication Data

US 2014/0171243 A1 Jun. 19, 2014

(51) Int. Cl.
*F16H 57/05* (2006.01)
*B62J 31/00* (2006.01)

(52) U.S. Cl.
CPC *F16H 57/05* (2013.01); *B62J 31/00* (2013.01)
USPC .......................................... 184/15.1

(58) Field of Classification Search
CPC ................................. B62J 31/00; F16H 57/05
USPC ............................................ 474/91; 184/15.1
See application file for complete search history.

(56) References Cited

U.S. PATENT DOCUMENTS

| | | | | |
|---|---|---|---|---|
| 3,618,713 A | * | 11/1971 | Batchelor | 184/15.1 |
| 3,720,289 A | | 3/1973 | Moldenhauer | |
| 4,120,380 A | | 10/1978 | Mann | |
| 5,269,614 A | * | 12/1993 | Taylor | 401/9 |
| 5,595,262 A | | 1/1997 | Martin | |
| 5,647,456 A | | 7/1997 | Gelb | |
| 6,679,352 B2 | | 1/2004 | Gillespie | |
| 8,181,747 B2 | * | 5/2012 | Feldstein | 184/15.1 |
| 8,757,325 B2 | * | 6/2014 | Singer | 184/15.1 |
| 2004/0182648 A1 | | 9/2004 | Ludwig | |
| 2010/0101607 A1 | * | 4/2010 | Feldstein | 134/15 |
| 2011/0250999 A1 | | 10/2011 | Nagele | |
| 2013/0274044 A1 | * | 10/2013 | Feldstein | 474/91 |

FOREIGN PATENT DOCUMENTS

| | | |
|---|---|---|
| CN | 2249714 Y | 3/1997 |
| CN | 201321115 Y | 10/2009 |
| CN | 201866215 U | 6/2011 |
| EP | 1780107 A2 | 5/2007 |
| GB | 297840 A | 9/1929 |
| GB | 2456521 A | 7/2009 |
| GB | 2463948 A | 4/2010 |

* cited by examiner

*Primary Examiner* — William E Dondero
*Assistant Examiner* — Robert T Reese

(57) ABSTRACT

One embodiment (100) collects air pressure created from forward motion of a motorcycle (300) in a reservoir assembly (1001) which stores a liquid lubricant, is attached to motorcycle frame (302), and comprises a containment chamber (102), cap (106), cap seal (104), air inlet port (107), lubricant outlet port (109), and an air inlet connector (108) and a lubricant outlet connector (110) to facilitate the external attachment of conduit. The air pressure is collected by and delivered to reservoir assembly (100-1) via an air collection conduit (118) attached to motorcycle front portion (306) by a mount (130) and urges liquid lubricant through a suction conduit (124), flow restrictor (112) and delivers lubricant via discharge conduit (114) to a chain applicator (116) attached to a motorcycle swing arm assembly (304) and to the inner circumference of drive chain (310). Lubricant flow ceases after motorcycle is stopped. Other embodiments are described and shown.

18 Claims, 7 Drawing Sheets

Figure 5:
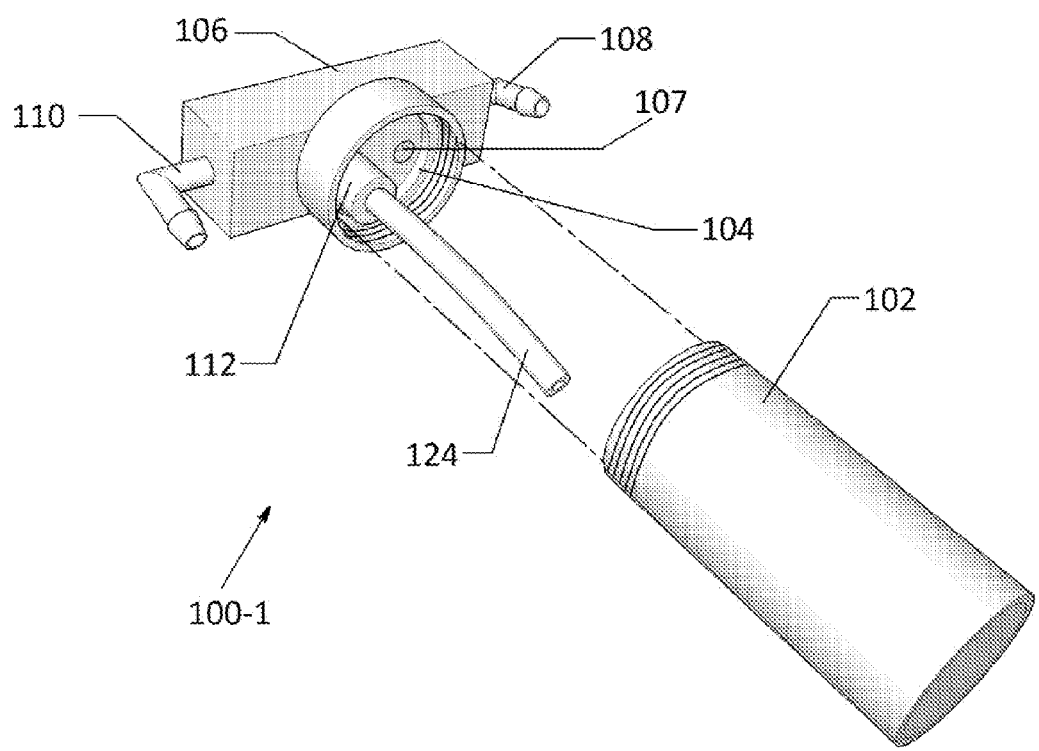

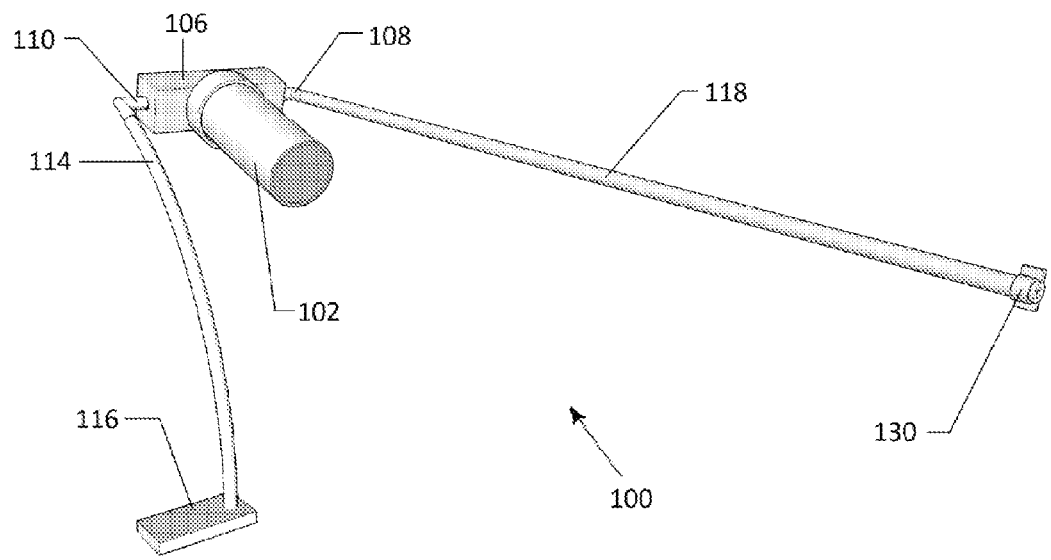
Fig. 1
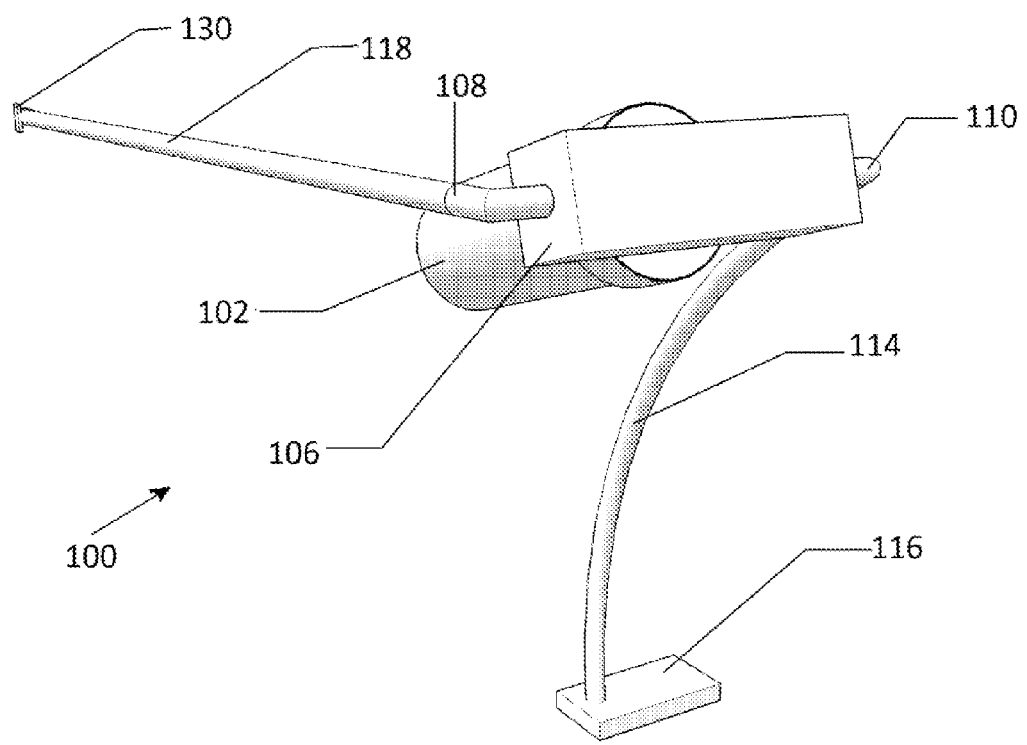
Fig. 1-A

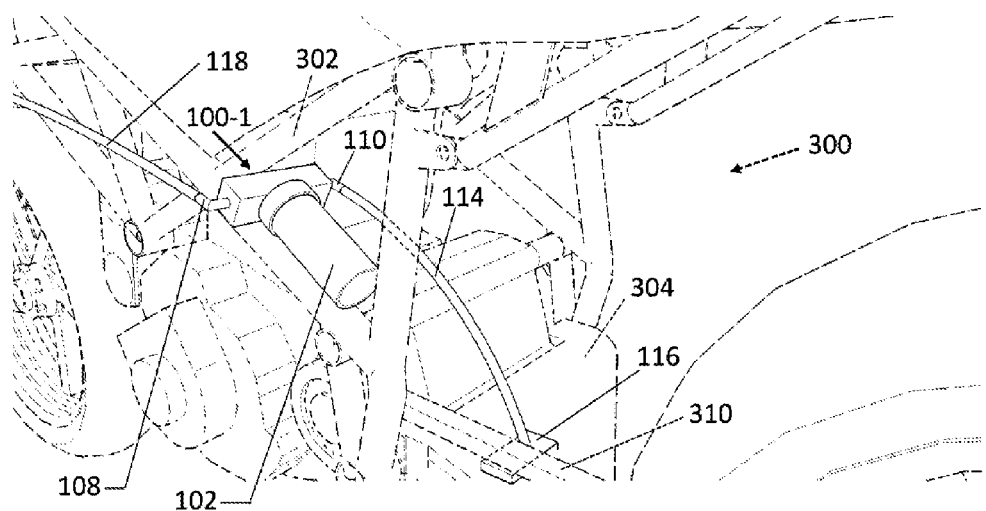
Fig. 1-B
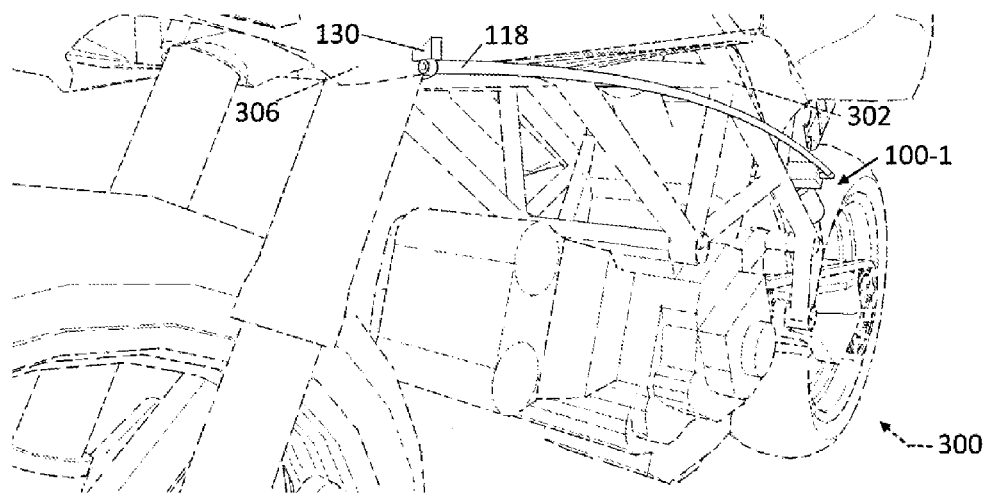
Fig. 1-C

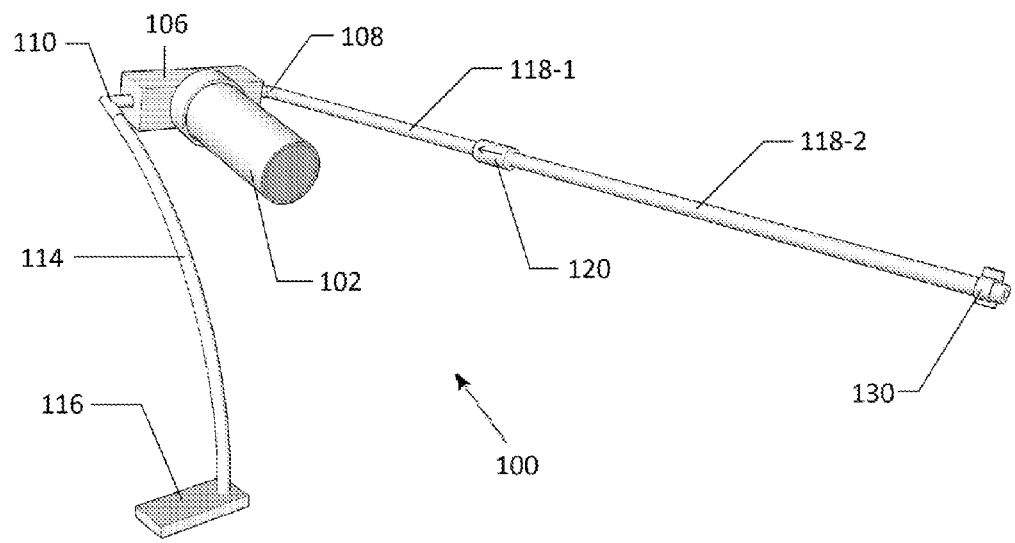
Fig. 2
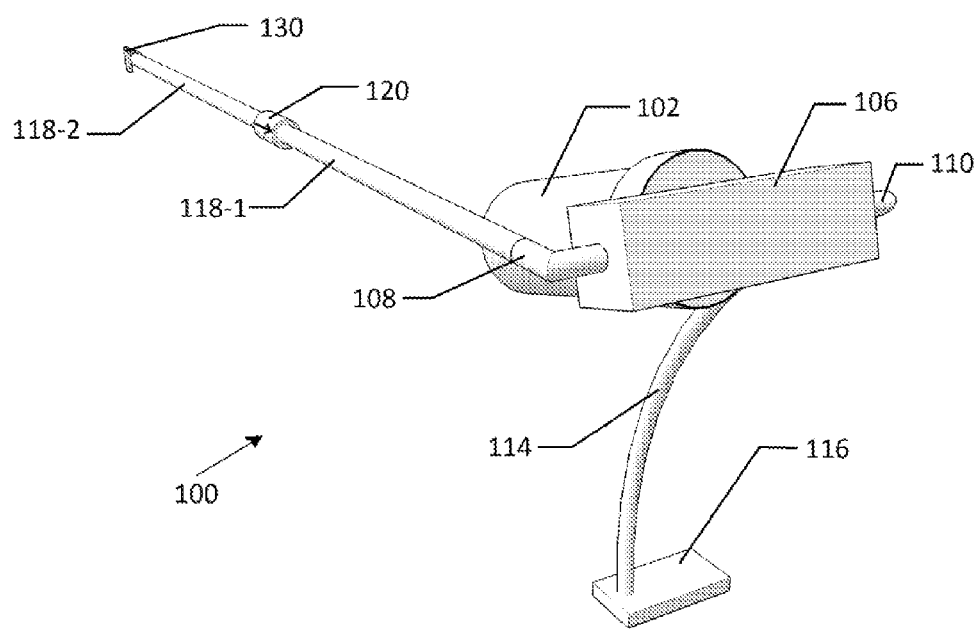
Fig. 2-A

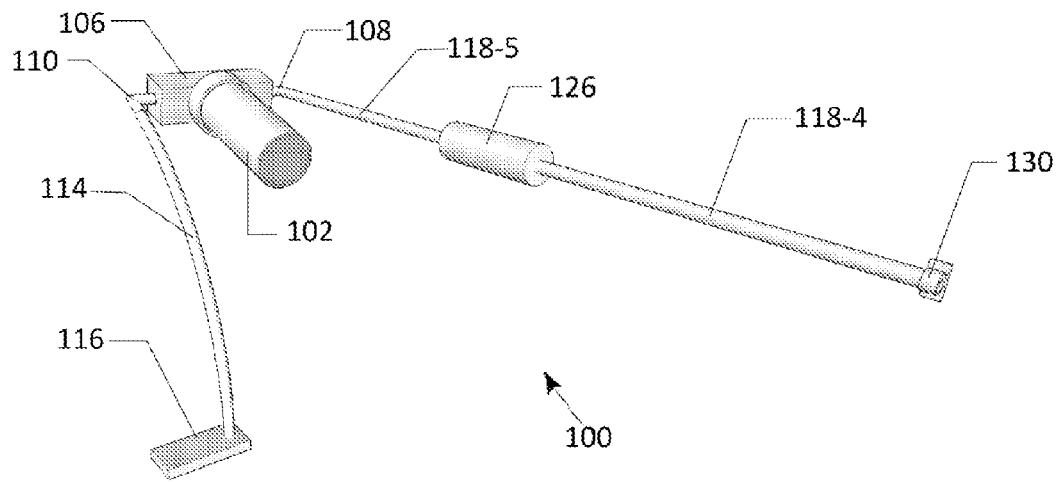
Fig. 3
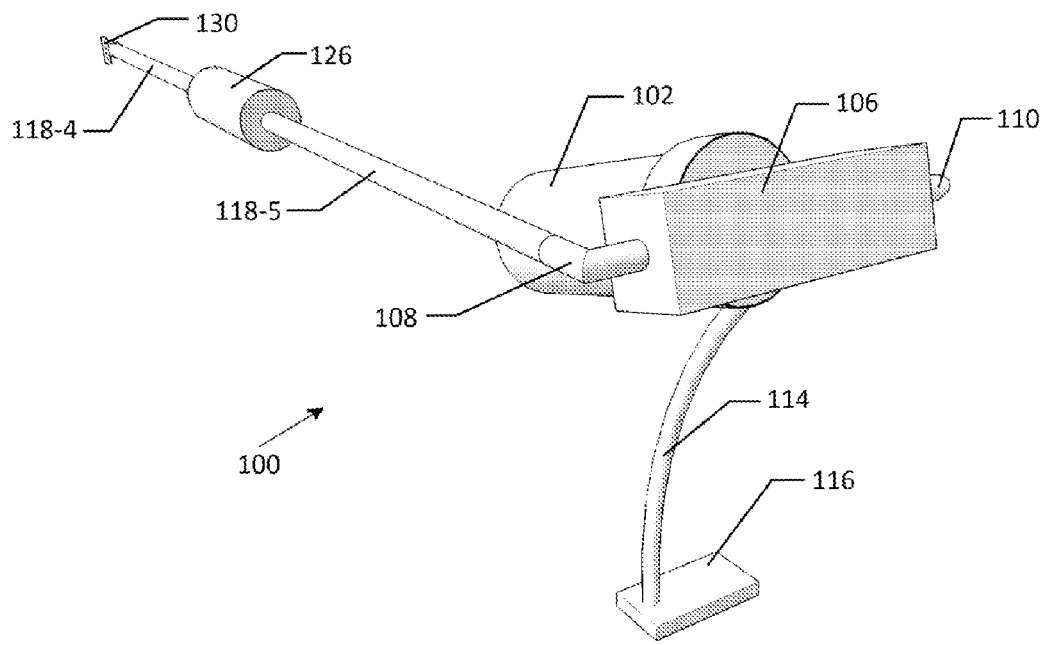
Fig. 3-A

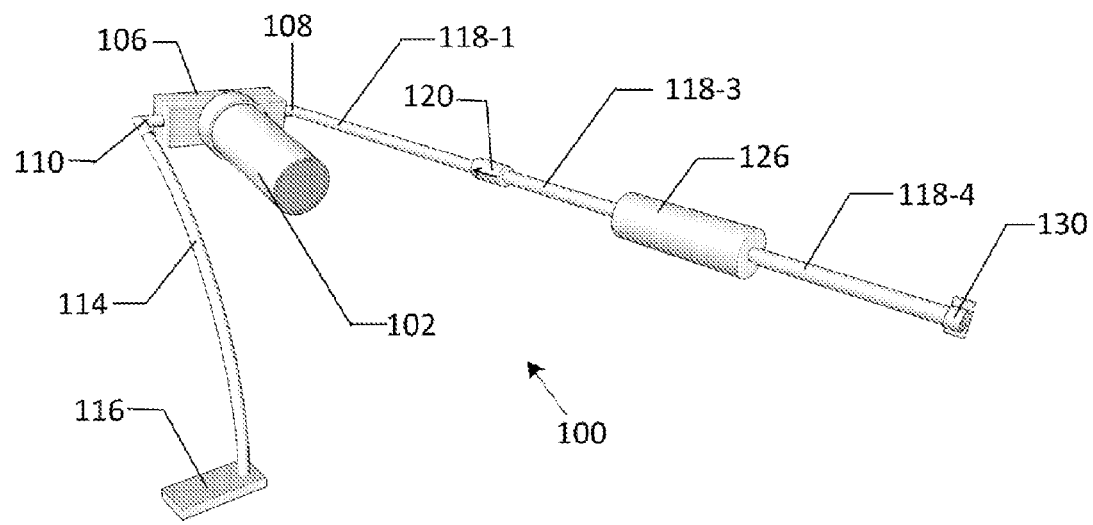
Fig. 4
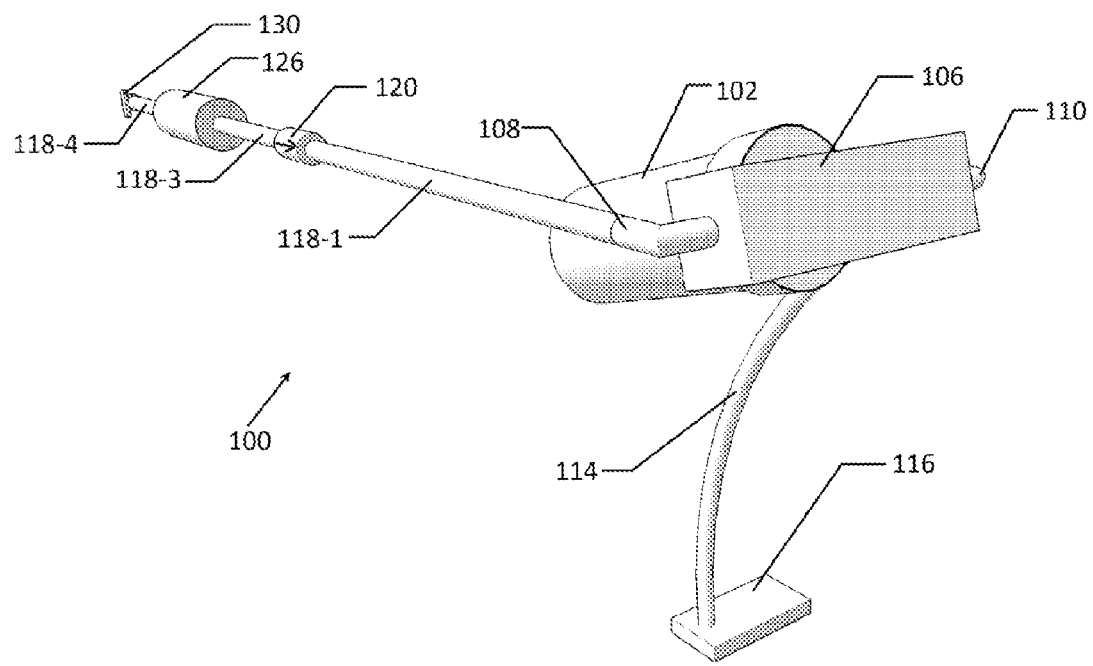
Fig. 4-A

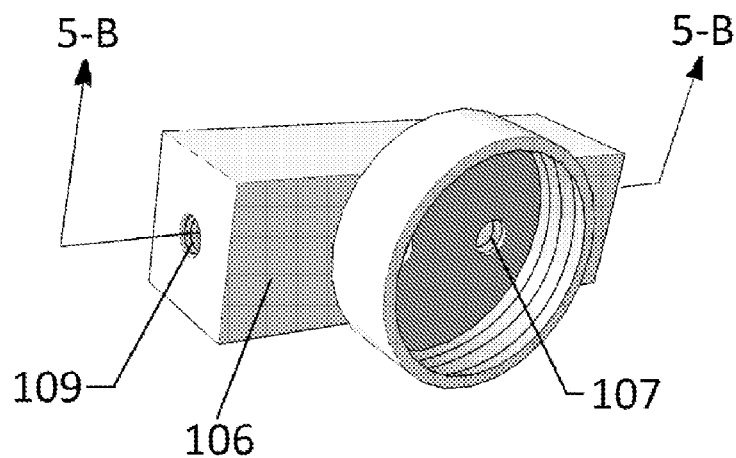
Fig. 5-A
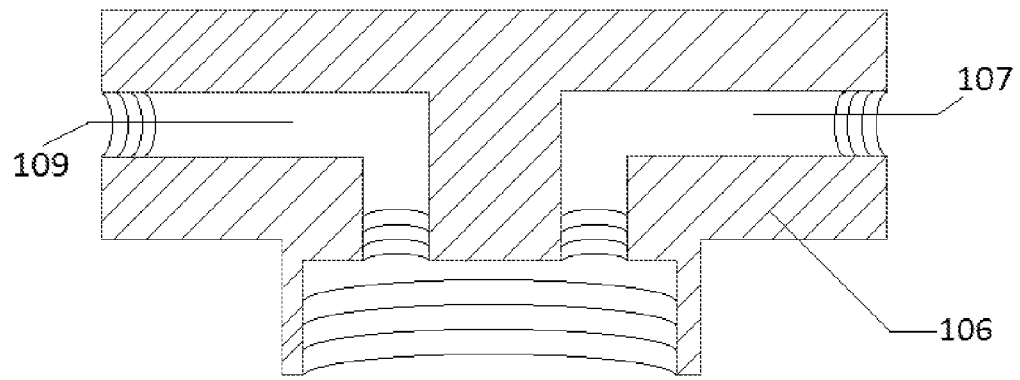
Fig. 5-B

WIND DRIVEN AUTOMATIC LUBRICATOR FOR A MOTORCYCLE DRIVE CHAIN

BACKGROUND

This application relates to motorcycle chain lubricators and, more particularly to a wind driven lubricator for automatically discharging lubricant to a motorcycle drive chain while the motorcycle is in motion.

BACKGROUND

1. Prior Art

The following is a tabulation of some prior art that presently appears relevant:

U.S Patents

| Patent Number | Kind Code | Issue Date | Patentee |
|---|---|---|---|
| 3,720,289 | | Mar. 13, 1973 | Moldenhauer |
| 4,120,380 | | Oct. 17, 1978 | Mann |
| 5,595,262 | | Jan. 21, 1997 | Martin |
| 5,647,456 | | Jul. 15, 1997 | Gelb |
| 6,679,352 | B2 | Jan. 20, 2004 | Gillespie |

U.S. Patent Application Publications

| Publication Number | Kind Code | Publication Date | Applicant |
|---|---|---|---|
| 20040182648 | A1 | Sep. 23, 2004 | Ludwig |
| 20110250999 | A1 | Oct. 13, 2011 | Nagele |

Foreign Patent Documents

| Cntry Code | Foreign Doc. Nr. | Kind Code | Publ. Date | App or Patentee |
|---|---|---|---|---|
| GB | 2456521 | A | Jul. 22, 2009 | Dilworth |
| GB | 2463948 | A | Apr. 7, 2010 | Stewart |

2. Description of Related Art

As is well known in the art, the drive chain of a motorcycle should be periodically lubricated to prevent deterioration of O-rings, corrosion of chain components, premature wear, breakage, or other malfunctions. Motorcycle manufacturers typically recommend lubrication at few hundred mile intervals, while the motorcycle is at rest and ideally while the chain is warm. Complete lubrication of the chain is normally effected by elevating the motorcycle rear wheel off the ground in order to facilitate rotation of the rear wheel to expose all sections of the chain, or lubricating the chain in short sections by rolling the motorcycle to expose inaccessible areas of the chain.

Motorcycle riders often defer or overlook lubrication of the chain due to the time needed, messiness of the operation, or inconvenience especially on long trips, where the tools and resources are lacking to complete the chain lubrication. Deferral of chain lubrication creates a safety hazard if the chain breaks while the motorcycle is in operation and also increases the maintenance time and cost due to more frequent adjustments and pre-mature replacement of chains and sprockets.

Numerous attempts have been made to solve the foregoing problems. In particular, U.S. Pat. No. 3,720,289, issued in the name of Moldenhauer, which is hereby incorporated herein by reference in its entirety addresses these problems and the relevant art and proposes solutions that involve an oiler comprised of a reservoir and a manually operated plunger type pump feeding a jet nozzle, which is directed at the juncture of the lower chain and rear sprocket. However a lubricator made in accordance with this reference is associated with several drawbacks: (1) the operation of the unit needs the attention of the operator which could jeopardize the safety of operator as well as the operators of other vehicles or pedestrians if operated while the vehicle is in motion, (2) the application of a jet spray to the chain/sprocket area only covers a portion of the chain and may be interrupted by wind and directed at unintended parts of the motorcycle possibly creating a safety hazard, and (3) the frequency of lubrication is subject to the operator's judgment and memory, which could result in over oiling or under oiling the chain.

U.S. Pat. No. 4,120,380, issued in the name of Mann, which is hereby incorporated herein by reference in its entirety also addresses these problems and the relevant art and proposes solutions that involve an oiler, housing a replaceable pressurized can of lubricant comprising a port and a plunger, which is mechanically operated by a cable mounted to the handlebars of the motorcycle. However a lubricator made in accordance with this reference is also associated with several drawbacks: (1) the operation of the unit needs the attention of the operator which could jeopardize the safety of operator as well as the operators of other vehicles or pedestrians if operated while the vehicle is in motion, (2) the pressurized can may emit gases that are harmful to the environment, (3) the mechanical cable requires periodic maintenance to prevent binding due to the plurality of moving parts, (4) only lubricants which are available in pressurized cans of the right size may be used, (5) the frequency of lubrication is subject to the operator's judgment and memory, which could result in over oiling or under oiling the chain, and (6) operation of a mechanism attached to the handlebar could impart unintended steering inputs, which could create a safety hazard.

U.S. Pat. No. 5,595,262, issued in the name of Martin, which is hereby incorporated herein by reference in its entirety also addresses these problems and the relevant art and proposes solutions that involve an oiler that stores oil in a refillable reservoir with an associated electric pump, which is operable by a compact electrical switch mounted to the handlebars of the motorcycle, and delivers oil to the chain through a conduit between the electric pump and an applicator. However a lubricator made in accordance with this reference is also associated with several drawbacks: (1) the operation of the unit needs the attention of the operator which could jeopardize the safety of operator as well as the operators of other vehicles or pedestrians if operated while the vehicle is in motion, (2) the oiler is powered from the vehicle electrical system, which could interfere with proper operation of the motorcycle should an electrical fault become present in the electrical pump or wiring, and (3) the frequency of lubrication is subject to the operator's judgment and memory, which could result in over oiling or under oiling the chain.

U.S. Pat. No. 5,647,456, issued in the name of Gelb, which is hereby incorporated herein by reference in its entirety also addresses these problems and the relevant art and proposes solutions that involve an oiler that utilizes a pressurized gas source to displace oil from a reservoir. The pressurized gas is allowed to flow via actuation of a momentary gas valve, located between the pressurized gas source and the reservoir. The lubricant is delivered from the reservoir to an applicator via a conduit. However a lubricator made in accordance with this reference is also associated with several drawbacks: (1) the operation of the unit needs the attention of the operator which could jeopardize the safety of the operator as well as the operators of other vehicles or pedestrians if operated while the vehicle is in motion, (2) the oiler is powered from a pressurized gas source which needs replacement when the gas is expended, (3) the momentary gas valve may leak through and cause an uncontrolled amount of lubricant to be expelled from the reservoir and over oil the chain, possibly creating a safety hazard, (4) the frequency of lubrication is subject to the operator's judgment and memory, which could result in over oiling or under oiling the chain, and (5) the device comprises a plurality of mechanical components that may be expensive to manufacture and maintain and take up valuable space on the motorcycle.

U.S. Pat. No. 6,679,352, issued in the name of Gillespie, which is hereby incorporated herein by reference in its entirety also addresses these problems and the relevant art and proposes solutions that involve an oiler that stores oil in a refillable container comprising a manually operated flow control valve and a relief air vent. The oil is fed by gravity through the flow control valve and a flexible conduit positioned to drip oil onto the chain. However a lubricator made in accordance with this reference is also associated with several drawbacks: (1) the operation of the unit needs the attention, memory, and judgment of the operator to start and adjust the flow before operation and to secure the flow when the motorcycle is parked , (2) the oiler drips oil onto the chain and thus may not be uniformly distributed to all areas of the chain which require lubrication and the oil drops may be interrupted by wind and directed at unintended parts of the motorcycle possibly creating a safety hazard, and (3) the flow rate of oil is subject to the operator's judgment and memory, which could result in over oiling or under oiling the chain and may not be ideal for different riding conditions and speeds, requiring additional adjustments.

U.S. Patent Application No. 20040182648, published in the name of Ludwig, which is hereby incorporated herein by reference in its entirety also proposes to address these problems and the relevant art and proposes solutions that involve an oiler that houses a replaceable pressurized can of lubricant comprising a trigger mechanism that is actuated by the operator to start and stop the flow of lubricant, which is directed at the drive chain. However a lubricator made in accordance with this reference is associated with several drawbacks: (1) the operation of the unit needs the attention of the operator which could jeopardize the safety of operator as well as the operators of other vehicles or pedestrians if operated while the vehicle is in motion, (2) the pressurized can may emit gases that are harmful to the environment, (3) only lubricants which are available in pressurized cans of the right size may be used, (4) the frequency of lubrication is subject to the operator's judgment and memory, which could result in over oiling or under oiling the chain, and (5) the application from a pressurized can to the chain only covers a portion of the chain and may be interrupted by wind and directed at unintended parts of the motorcycle possibly creating a safety hazard.

Great Britain Patent Document No. 2456521, published in the name of Dilworth, which is hereby incorporated herein by reference in its entirety also addresses these problems and the relevant art and proposes solutions that involve an oiler comprising a reservoir, which comprises a filler tube, breather tube and feeds a valve comprising a spring-biased valve ball. When the vehicle is in motion, bumps and undulating ground surfaces cause the ball to lift from its seat to release oil down a feeder tube. However a lubricator made in accordance with this reference is associated with several drawbacks: (1) the frequency and amount of lubrication is subject to the roughness of the ground surface, which could result in over oiling the chain at slower speeds on rough surfaces or under oiling the chain at higher speeds on smooth surfaces, (2) the valve seat may wear over time, causing leakage past the spring-biased ball and over oiling the chain or the release of oil while the motorcycle is at rest, possibly creating a safety hazard or contaminating the environment, and (3) the vibration characteristics of an individual motorcycle may be influenced by many factors, such a suspension settings, rider weight, engine characteristics and state of tune which may cause more or less oil to be released than initially designed.

Great Britain Patent Document No. 2463948, published in the name of Stewart, which is hereby incorporated herein by reference in its entirety also addresses these problems and the relevant art and proposes solutions that involve an oiler comprising a reservoir with an integrated electric pump and breather. The pump is actuated based on inputs from an electronic controller which utilizes vibration sensor inputs to determine if the vehicle is in motion. The controller is adapted to distinguish between vehicle vibrations while the vehicle is in motion and vehicle vibrations while the vehicle is stationary and receives power from the vehicle electrical system or may have a separate power supply. However a lubricator made in accordance with this reference is associated with several drawbacks: (1) the vibration characteristics for various vehicles may differ and/or change over time resulting in over oiling of the chain while the vehicle is at rest if the motorcycle exceeds the vibration thresholds of the controller, or under oiling while the vehicle is in motion if the motorcycle vibrations do not reach the vibration threshold, (2) the system is complex, expensive to manufacture, and prone to failures due to the plurality of electrical/electronic components, (3) if the oiler is powered from the vehicle electrical system, it could interfere with proper operation of the vehicle should an electrical fault become present in the electrical controller, pump or wiring, (4) if the oiler is powered from a separate power supply, it will have a limited range before replacement of the power source is needed (5) the amount of oil delivered to the chain does not vary with the vehicle speed, which may cause under oiling the chain at higher speeds or over oiling of the chain at lower speeds, and (6) the repair of the unit electrical/electronic components and sensors may be beyond the capabilities of the vehicle operator or mechanics who are not trained by the manufacturer, resulting in high maintenance and repair costs.

U.S. Patent Application No. 20110250999, published in the name of Nagele, which is hereby incorporated herein by reference in its entirety also proposes to address these problems and the relevant art and proposes solutions that involve an oiler that comprises a rail device with a longitudinal side that may be brought to bear against the drive chain, which comprises a guide element region formed of solid lubricant which is transferred to the chain. However a lubricator made in accordance with this reference is associated with several drawbacks: (1) the mounting of the rail system may vary between different motorcycle models and manufacturers, requiring customization which may require specialized experience or training to be given by the manufacturer for safe and efficient installation, (2) solid lubricants which are formed into guide elements are generally not as readily available as liquid lubricants and may need to be acquired from the manufacturer at a greater expense than traditional liquid lubricants, (3) the rail device may need to be removed from the motorcycle to facilitate replacement of the solid lubricant guide element, (4) most motorcycle manufacturers recommend liquid lubricants and the use of solid lubricants may void some portions of the warranty, and (5) the replacement of the solid lubricant/guide element may require skill beyond that of the motorcycle operator, which increases maintenance costs.

Consequently, there is a need for providing a simplified, safe, and automated lubricator for a motorcycle drive chain that delivers lubricant while a motorcycle is in forward motion, wherein the lubricator overcomes problems with the prior art such as: (1) bulkiness, (2) the need for intervention or attention of the operator while the motorcycle is in operation, (3) mechanical and/or electrical complexity, (4) the need for specialized lubricant cans or specially formed solid lubricants, (5) imprecise lubrication due to operator judgment, (6) imprecise lubrication due to improper trigger mechanisms to start, regulate, or stop lubricant flow, (7) non-uniform distribution of lubricant to the drive chain, (8) the need to connect to the motorcycle systems, and (9) high maintenance and operational cost.

SUMMARY

In accordance with one embodiment an automatic wind driven chain lubricator, which is attachable to a motorcycle, is provided for automatically distributing lubricant to a motorcycle drive chain particularly while the motorcycle is in forward motion. The lubricant is naturally urged from a reservoir using air pressure, which is created by the wind while the motorcycle is in forward motion and delivered to the reservoir via an air collection conduit. The lubricant flows from the reservoir through a lubricant suction conduit, flow restrictor, and lubricant discharge conduit to an applicator which applies the lubricant to the inside radius of the drive chain. Once the motorcycle is no longer in forward motion, the pressure in the reservoir drops due to the lack of the wind to maintain the pressure, and the lubricant flow naturally stops.
Advantages Accordingly several advantages of one or more aspects are as follows: (1) the delivery of lubricant is provided automatically simply via the action of riding the motorcycle, (2) no external power is required and therefore needs no connection to the motorcycle systems or other independent power source (3) the chain lubricator needs no intervention or attention of the operator of the motorcycle during operation, which provides for increased safety, (4) the chain lubricator has minimal moving parts which provides for reliable operation and low maintenance, (5) the simple design allows for flexible mounting options and a wide variety of lubricants to be used, (6) the amount of lubricant delivered varies with the speed of the motorcycle and thus the speed of the chain, which alleviates issues caused by over or under lubrication of the chain, and (7) lubricant is applied uniformly to each section of drive chain. Other advantages will be apparent from a consideration of the drawings and ensuing descriptions.

DRAWINGS—FIGURES

In the drawings, closely related figures have the same number but different alphabetic suffixes.

FIG. 1 shows a front perspective view of one embodiment with a re-sealable reservoir and a simple air collection conduit.

FIG. 1-A shows a rear perspective view of one embodiment with a re-sealable reservoir and a simple air collection conduit.

FIG. 1-B shows a rear perspective view of one embodiment of the chain lubricator affixed in an operative position to a conventional motorcycle particularly to show the reservoir assembly and lubricant applicator orientation and mounting locations, in which the motorcycle parts are shown in broken lines for illustrative purposes.

FIG. 1-C shows a front perspective view of one embodiment of the chain lubricator affixed in an operative position to a conventional motorcycle particularly to show the air collection conduit mount orientation and mounting location, in which the motorcycle parts are shown in broken lines for illustrative purposes.

FIG. 2 shows a front perspective view of a second embodiment with a re-sealable reservoir and a check valve in the air collection conduit.

FIG. 2-A shows a rear perspective view of a second embodiment with a re-sealable reservoir and a check valve in the air collection conduit.

FIG. 3 shows a front perspective view of a third embodiment with a re-sealable reservoir and a filter/water trap in the air collection conduit.

FIG. 3-A shows a rear perspective view of a third embodiment with a re-sealable reservoir and a filter/water trap in the air collection conduit.

FIG. 4 shows a front perspective view of a fourth embodiment with a re-sealable reservoir and both a check valve and filter/water trap in the air collection conduit.

FIG. 4-A shows a rear perspective view of a fourth embodiment with a re-sealable reservoir and a check valve and filter/water trap in the air collection conduit.

FIG. 5 shows a perspective view of a reservoir assembly with a lubricant containment chamber separated from a reservoir cap to show a lubricant reservoir suction conduit, a reservoir seal cap, and a lubricant flow restrictor.

FIG. 5-A shows a perspective view of the reservoir cap and defines a section view 5-B of the reservoir cap.

FIG. 5-B shows a section view of the reservoir cap to show the porting between the open and closed ends of the reservoir cap.

DRAWINGS—REFERENCE NUMERALS

| Lubricator Reference Numerals | |
|---|---|
| 100- wind driven automatic lubricator | 100-1- reservoir assembly |
| 102- lubricant containment chamber | 104- lubricant reservoir cap seal |
| 106- lubricant reservoir cap | 108- lubricant reservoir air inlet connector |
| 107- lubricant reservoir inlet port | 109- lubricant reservoir outlet port |
| 110- lubricant reservoir outlet connector | 112- lubricant flow restrictor |
| 114-lubricant discharge conduit | 116- lubricant chain applicator |
| 118- air collection conduit | 118-1- check valve-reservoir inlet conduit |
| 118-2- check valve inlet conduit | 118-3- filter/water trap-check valve conduit |
| 118-4- filter/water trap inlet conduit | 118-5- filter/water trap- reservoir inlet conduit |
| 120- air collection check valve | 124- lubricant reservoir suction conduit |
| 126- air collection conduit filter/water trap | 130- air collection conduit mount |
| Motorcycle Reference Numerals | |
| 300- motorcycle | 302- motorcycle frame |
| 304- motorcycle swing arm assembly | 306- motorcycle front portion |
| 310- motorcycle drive chain | |

DETAILED DESCRIPTION

FIGS. 1, 1-A, 1-B, 1-C, 5, 5-A, and 5-B—First Embodiment One embodiment of a wind driven automatic lubricator 100 is illustrated in FIGS. 1 and 1-A, with more specific details shown in FIG. 5, 5-A, and 5-B. FIG. 5 depicts a reservoir assembly 100-1 comprised of a lubricant containment chamber 102, a lubricant reservoir cap 106, a lubricant reservoir cap seal 104, a lubricant reservoir air inlet connector 108, a lubricant reservoir outlet connector 110, a lubricant flow restrictor 112, and a lubricant reservoir suction conduit 124. Chamber 102 is comprised of a hollow cylinder, closed at one end and preferably threaded at the opposite end to facilitate connection to cap 106. Chamber 102 is preferably manufactured from a durable translucent plastic material to facilitate visual detection of a fluid level in chamber 102 without disconnection from cap 106.

As shown in FIGS. 5-A and 5-B, cap 106 comprises a first end which is closed and comprises a block comprising a lubricant reservoir inlet port 107 and a lubricant reservoir outlet port 109, and a second end which is open and comprises a threaded connection to facilitate attachment to chamber 102 (see FIG. 5). Cap 106 is preferably manufactured from a lightweight metal material such as aluminum, or a durable plastic material. Inlet port 107 and outlet port 109 are preferably threaded at each end to facilitate attachment of components as described below.

Referring to FIG. 5, the first end of cap 106 connects to inlet connector 108 and outlet connector 110 each comprising a first and second end. Inlet connector 108 and outlet connector 110 each comprise a threaded connection at the first end to facilitate connection to inlet port 107 and outlet port 109 respectively and a barb connection at the second end to facilitate the connection of conduit. Inlet connector 108 and outlet connector 110 may be rotated to facilitate the most efficient mounting and orientation of reservoir assembly 100-1.

Seal 104 provides a seal between cap 106 and chamber 102, whereby cap 106 may be detached from chamber 102 to allow for convenient filling or refilling with lubricant and subsequently resealed. Seal 104 is preferably a rubber O-ring or gasket type of seal. Restrictor 112 is provided, comprising a first and second end and is preferably a wick type restrictor, comprising a rigid passage enclosing a wicking material (not shown). The density of the wicking material is specified to provide the optimum flow rate of lubricant to the chain. The first end of restrictor 112 is preferably threaded to facilitate connection to inside of cap 106 at outlet port 109 (see FIG. 5B). Restrictor 112 preferably comprises a barb connection at the second end (not shown) to facilitate the connection of conduit. Suction conduit 124, comprising a first and second end, is attached to the second end of restrictor 112 at the barb connection at the first end and open ended, terminating in a lower region of chamber 102 at the second end when chamber 102 is attached securely to cap 106.

As shown in FIG. 1, a lubricant discharge conduit 114, comprising a first and second end, is attached via barb connector to the second end of outlet connector 110 at the first end and to a lubricant chain applicator 116 at the second end. Discharge conduit 114 is preferably made from flexible translucent tubing. Applicator 116 is preferably manufactured from SAE F-1 felt and comprises a barb connector embedded into the felt (not shown) to facilitate the connection of discharge conduit 114. An air collection conduit 118, comprising a first and second end, is attached to the second end of inlet connector 108 at the barb connection at the first end and open ended at the second end and secured via an air collection conduit mount 130 at the second end. Air collection conduit 118 is preferably made from flexible translucent tubing.

FIG. 1-B depicts a location and orientation of reservoir assembly 100-1, air collection conduit 118, discharge conduit 114, and applicator 116 on a motorcycle 300. Reservoir assembly 100-1 is mounted to a motorcycle frame 302, preferably using clamps or ties made of a lightweight metal or durable plastic (not shown). Reservoir assembly 100-1 is oriented such that outlet connector 110 is located above the natural liquid lubricant level in chamber 102. Applicator 116 is affixed to a motorcycle swing arm assembly 304, preferably using a durable oil resistant adhesive, such that it contacts the inside radius of a motorcycle drive chain 310 to facilitate the application of liquid lubricant.

Referring to FIG. 1-C, mount 130 affixes air collection conduit 118 to a motorcycle front portion 306 such that air collection conduit 118 is oriented with the open end directed forward into the oncoming airstream which is created while motorcycle 300 is in forward motion. Air collection conduit 118 may be secured to adjacent components of motorcycle 300 via cable ties or other securing devices (not shown) as necessary between mount 130 and reservoir assembly 100-1. Mount 130 is preferably made from a lightweight metal such as aluminum or a durable plastic and is attached to motorcycle front portion 306 using a durable waterproof adhesive.

Referring to FIG. 1-B, reservoir assembly 1004 and its component parts are sized and oriented on motorcycle 300 such that the air pressure developed in chamber 102 at normal motorcycle speeds be sufficient to displace lubricant the vertical height difference between the second end of suction conduit 124 (see FIG. 5) and outlet connector 110 to enable displacement of lubricant from reservoir assembly 100-1. The routing of the conduit and components depicted in FIG. 1-B and 1-C is shown to demonstrate the main attachment points and operational configuration. In practice many of the components would be concealed behind bodywork and attached to adjacent components of motorcycle 300 preferably via cable ties or other securing devices.

Operation—FIGS. 1, 1-B, 1-C, 5, 5-A, and 5-B—First Embodiment

Referring to FIG. 5, chamber 102 is detached from cap 106, filled with liquid lubricant, and reattached to cap 106 via threaded connection, ensuring that chamber 102 is tightened against seal 104 to prevent leakage. Referring to FIGS. 1, 1-B, and 1-C, lubricator 100 (see FIG. 1) is started automatically when motorcycle 300 (see FIGS. 1-B and 1-C) is set in forward motion by the operator which naturally creates air flow across motorcycle 300. Referring to FIG. 1, the air flow enters and travels through air collection conduit 118, inlet connector 108, inlet port 107 (see FIGS. 5A and 5-B), and into chamber 102. Referring to FIG. 5, air pressure builds in chamber 102 as the air comes into contact with the liquid lubricant surface. Once the air pressure becomes sufficient, liquid lubricant is urged through suction conduit 124, restrictor 112, outlet port 109 (see FIG. 5-B), and outlet connector 110. Referring to FIG. 1, liquid lubricant then flows through discharge conduit 114 and into applicator 116 via force of gravity.

Referring to FIG. 1-B, applicator 116 transfers a thin film of liquid lubricant to the inside radius of drive chain 310 while motorcycle 300 is in motion as drive chain 310 moves across applicator 116. Air pressure in chamber 102 drops and lubricant flow stops automatically, once motorcycle 300 is no longer in forward motion. Residual liquid lubricant which remains in discharge conduit 114 will flow via force of gravity to and be absorbed into applicator 116 after motorcycle 300 is no longer in forward motion. Referring to FIG. 5, upon visual detection of low lubricant level in chamber 102, chamber 102 may be disconnected from cap 106, refilled, and re-connected to cap 106.

FIGS. 1B, 1C, 2, 2-A, 5, 5A and 5B—Second Embodiment Description

A second embodiment of wind driven automatic lubricator 100 is illustrated in FIGS. 2 and 2-A, with more specific details shown in FIGS. 5, 5-A, and 5-B. Referring to FIG. 2, the detailed description of the second embodiment is identical to the detailed description of the first embodiment, with the exception that air collection conduit 118 is not used and an air collection check valve 120 comprising an inlet and outlet is installed as follows. A check valve inlet conduit 118-2 comprising a first and second end is attached to check valve 120 inlet at the first end and open ended and secured to mount 130 at the second end. A check valve-reservoir inlet conduit 118-1 comprising a first and second end is attached to check valve 120 outlet at the first end and to the second end barb connection of inlet connector 108 at the second end. Check valve-reservoir inlet conduit 118-1 and check valve inlet conduit 118-2 are preferably made from flexible translucent tubing. Check valve 120 is preferably made from a durable plastic material with barb connections at both the inlet and outlet and is oriented such that flow is only permitted in the direction toward inlet connector 108. Referring to FIGS. 1-B and 1-C, the main attachment points and operational configuration of reservoir assembly 100-1 and mount 130 on motorcycle 300 are identical to the first embodiment. Air collection conduit 118 is replaced by check valve inlet conduit 118-2, check valve 120, and check valve-reservoir inlet conduit 118-1, which may be secured to adjacent components of motorcycle 300 via cable ties or other securing devices.

FIGS. 2, 5, 5A, and 5B—Second Embodiment Operation

Referring to FIG. 2, the operation of the second embodiment is identical to that of the first embodiment, with the exception that air flow passes through check valve inlet conduit 118-2, check valve 120, and check valve-reservoir inlet conduit 118-1 prior to reaching inlet connector 108. When airflow stops, air pressure remains trapped between check valve 120 and the liquid lubricant surface inside of chamber 102. Referring to FIG. 5, within a short period of time, the air pressure dissipates as lubricant is discharged through suction conduit 124, restrictor 112, outlet port 109 (see FIGS. 5A and 5B), and outlet connector 110. Referring to FIG. 2, the residual flow of liquid lubricant will then flow via gravity through discharge conduit 114, and be absorbed into applicator 116. The advantage of the second embodiment is that pressure fluctuations in chamber 102 caused by frequent speed changes of motorcycle 300, such as in stop and go traffic, are substantially reduced.

FIGS. 1B, 1C, 3, 3-A, 5, 5A, and 5B—Third Embodiment Description A third embodiment of wind driven automatic lubricator 100 is illustrated in FIGS. 3 and 3-A, with more specific details shown in FIGS. 5, 5-A, and 5-B. Referring to FIG. 3, the detailed description of the third embodiment is identical to the detailed description of the first embodiment, with the exception that air collection conduit 118 is not installed and an air collection conduit filter/water trap 126 comprising an inlet and outlet is installed as follows. A filter/water trap inlet conduit 118-4 having a first and second end is attached to filter/water trap 126 inlet at the first end and open ended and secured to mount 130 at the second end. A filter/water trap-reservoir inlet conduit 118-5 comprising a first and second end, is attached to filter/water trap 126 outlet at the first end and to inlet connector 108 barb connection at the second end. Filter/water trap 126 is comprised of a hollow cylinder forming a chamber for collection of water droplets which may be entrained in the airstream, is preferably made from durable translucent plastic material with barb connections at both the inlet, and outlet ends and comprises a replaceable filter media (not shown). Filter/water trap inlet conduit 118-4 and filter/water trap-reservoir inlet conduit 118-5 are preferably made from flexible translucent tubing. Referring to FIGS. 1-B and 1-C, the main attachment points and operational configuration of reservoir assembly 100-1 and mount 130 on motorcycle 300 are identical to the first embodiment. Air collection conduit 118 is replaced by filter/water trap inlet conduit 118-4, filter/water trap 126, and filter/water trap- reservoir inlet conduit 118-5, which may be secured to adjacent components of motorcycle 300 via cable ties or other securing devices.

FIG. 3—Third Embodiment Operation

Referring to FIG. 3, operation of third embodiment is identical to that of the first embodiment, with the exception that the air flow passes through filter/water trap inlet conduit 118-4, filter/water trap 126, and filter/water trap-reservoir inlet conduit 118-5 prior to reaching inlet connector 108. The advantage of the third embodiment is that water or particles that may be entrained in the airstream will be substantially removed and will not contaminate the liquid lubricant in chamber 102.

FIGS. 1B, 1C, 4, 4-A, 5, 5-A, and 5-B—Fourth Embodiment Description A fourth embodiment of wind driven automatic lubricator 100 is illustrated in FIGS. 4 and 4-A, with more specific details shown in FIGS. 5, 5-A, and 5-B. Referring to FIG. 4, the detailed description of the fourth embodiment is identical to the detailed description of the first embodiment, with the exception that air collection conduit 118 is not installed and an air collection check valve 120 comprising an inlet and outlet and an air collection conduit filter/water trap 126 also comprising an inlet and outlet are installed as follows. A filter/water trap inlet conduit 118-4 comprising a first and second end, is connected to filter/water trap 126 inlet at the first end and open ended and secured to mount 130 at the second end. A filter/water trap-check valve conduit 118-3 comprising a first and second end is connected to filter/water trap 126 outlet at the first end and to check valve 120 inlet at the second end. A check valve-reservoir inlet conduit 118-1 comprising a first and second, is attached to check valve 120 outlet at the first end and to inlet connector 108 barb connection at the second end. Check valve 120 is preferably made from durable plastic material with barb connections at both the inlet and outlet and oriented such that flow is only permitted in the direction toward inlet connector 108. Filter/water trap 126 is comprised of a hollow cylinder forming a chamber for collection of water droplets which may be entrained in the airstream, is preferably made from durable translucent plastic material with barb connections at both the inlet and outlet, and comprises a replaceable filter media (not shown). Filter/water trap inlet conduit 118-4, filter/water trap-check valve conduit 118-3, and check valve-reservoir inlet conduit 118-1 are preferably made from flexible translucent tubing. Referring to FIGS. 1-B and 1-C, the main attachment points and operational configuration of reservoir assembly 100-1 and mount 130 on motorcycle 300 are identical to the first embodiment. Air collection conduit 118 is replaced by filter/water trap inlet conduit 118-4, filter/water trap 126, filter/water trap-check valve conduit 118-3, check valve 120, and check valve-reservoir inlet conduit 118-1, which may be secured to various components of motorcycle 300 via cable ties or other securing devices.

FIGS. 4, 5, 5A, and 5B—Fourth Embodiment Operation

Referring to FIG. 4, the operation of the fourth embodiment is identical to that of the first embodiment, with the exception that air flow passes through filter/water trap inlet conduit 118-4, filter/water trap 126, filter/water trap-check valve conduit 118-3, check valve 120, and check valve-reservoir inlet conduit 118-1 prior to reaching inlet connector 108. When air flow stops, air pressure remains trapped between check valve 120 and the liquid lubricant surface inside of chamber 102. Referring to FIG. 5, within a short period of time, air pressure dissipates as lubricant is discharged through suction conduit 124, restrictor 112, outlet port 109 (see FIGS. 5A and 5B), and outlet connector 110. Referring to FIG. 4, the residual flow of liquid lubricant will then flow through discharge conduit 114, and be absorbed into applicator 116. One advantage of the fourth embodiment is that water or particles that may be entrained in the airstream will be substantially removed by filter/water trap 126 and will not contaminate the liquid lubricant in chamber 102. A second advantage of the fourth embodiment is that pressure fluctuations in chamber 102 caused by frequent speed changes are substantially reduced.

CONCLUSION, RAMIFICATIONS, AND SCOPE

Accordingly the reader will see that a wind driven automatic lubricator for a drive chain of a motorcycle of the various embodiments may be used for efficient, continuous, and automated lubrication. The chain lubricator has additional advantages in that:
(1) the delivery of lubricant is provided automatically and simply via the action of riding the motorcycle,
(2) the automatic lubricator requires no external power, and therefore requires no connection to vital motorcycle systems thus will not induce faults, resulting in increased safety and reduced maintenance and repair costs,
(3) the automatic lubricator needs no intervention or attention of the rider of the motorcycle during operation, which provides for increased safety for both the rider and general public,
(4) the only moving parts are check valve internals, when so equipped, which provides for low maintenance,
(5) the only wear part is the felt lubricant chain applicator, which is inexpensive and simple to replace by persons with basic mechanical ability, providing for a low cost to operate and maintain,
(6) the simple and compact design allows for flexible mounting options,
(7) a wide range of liquid lubricants may be used, resulting in flexibility and low cost of operation,
(8) the amount of lubricant delivered varies with the speed of the motorcycle and thus the speed of the chain, which alleviates maintenance and safety issues caused by over or under lubrication of the chain due to imprecise trigger mechanisms, and
(9) lubricant is delivered uniformly to the inside radius of each link of drive chain and is not susceptible to being misdirected to unintended parts of the motorcycle, providing for increased safety.

Although the descriptions above contain much specificity, these should not be construed as limiting the scope of the embodiments but as merely providing illustrations of some of several possible embodiments. For example, the lubricant reservoir may have other shapes; alternate mounting locations on the motorcycle; have a drain conduit; different types of flow restrictors may be used in alternate arrangements; a fill conduit or fill port may be used in lieu of detaching the containment chamber from the reservoir cap; different types of chain applicators may be used, such as sprocket feeders; non-flexible or opaque tubing may be used; different methods of attaching the lubricator components may be used; separate air filters, water traps and check valves may be used or integrated into the reservoir assembly, etc. Although the embodiments are primarily contemplated for motorcycles, other uses may become apparent to those skilled in the art after considering this specification and the accompanying drawings which disclose several embodiments thereof. All such changes, modifications, variations, and other uses that do not depart from the spirit and scope of the embodiments are deemed to be covered by the embodiments. Thus the scope of the embodiments should be determined by the appended claims and their legal equivalents, rather than by the examples given.

I claim:

1. A wind driven automatic lubricator for a drive chain of a motorcycle, securable to said motorcycle, comprising:
   a. a hollow enclosure defining a reservoir for storing a liquid lubricant, comprising an inlet port and an outlet port,
   b. a first means for directing airflow generated by forward motion of said motorcycle into said inlet port of said reservoir, whereby increasing pressure inside of said reservoir while said motorcycle is in forward motion,
   c. a second means for said liquid lubricant to be conveyed from said reservoir through said outlet port to said drive chain wherein the highest point of conveyance is located vertically above the natural level of said liquid lubricant in said reservoir, whereby said liquid lubricant will be conveyed only when said reservoir is sufficiently pressurized, and
   d. a third means for limiting the rate at which said liquid lubricant is conveyed from said reservoir to said drive chain.

2. The wind driven automatic lubricator of claim 1, wherein said reservoir comprises a containment chamber for containing said liquid lubricant and a sealing cap, whereby said sealing cap may be detached from said containment chamber, said liquid lubricant may be replenished, and said reservoir may be re-sealed by replacement of said sealing cap.

3. The wind driven automatic lubricator of claim 2, wherein said containment chamber comprises a fourth means for determination of the level of said liquid lubricant without detaching said sealing cap.

4. The wind driven automatic lubricator of claim 1, wherein said third means for limiting the rate at which said liquid lubricant is conveyed from said reservoir to said drive chain comprises a passage enclosing a wicking material, whereby the flow rate of said liquid lubricant may be substantially controlled.

5. The wind driven automatic lubricator of claim 1, wherein said wind driven automatic lubricator further includes a fourth means for permitting flow in one direction only into said inlet port of said reservoir, whereby substantially reducing pressure fluctuations in said reservoir.

6. The wind driven automatic lubricator of claim 1, wherein said wind driven automatic lubricator further includes a fourth means for minimizing water contamination of said liquid lubricant in said reservoir.

7. The wind driven automatic lubricator of claim 1, wherein said wind driven automatic lubricator further includes a fourth means for minimizing particulate contamination of said liquid lubricant in said reservoir.

8. The wind driven automatic lubricator of claim 1, wherein said second means for said liquid lubricant to be conveyed from said reservoir through said outlet port to said drive chain comprises a lubricant chain applicator made from a durable absorbent material, installed at a location on said motorcycle to cause said lubricant chain applicator come in contact with said drive chain.

9. The wind driven automatic lubricator of claim 1, wherein:
   a. said reservoir comprises a containment chamber for containing said liquid lubricant, a sealing cap, and a fourth means for determination of the level of said liquid lubricant without detaching said sealing cap,
b. said third means for limiting the rate at which said liquid lubricant is conveyed from said reservoir to said drive chain is comprised of a passage enclosing a wicking material,
c. said wind driven automatic lubricator further includes a fifth means for permitting flow in one direction only into said inlet port of said reservoir,
d. said wind driven automatic lubricator further includes a sixth means for minimizing water contamination of said liquid lubricant in said reservoir,
e. said wind driven automatic lubricator further includes a seventh means for minimizing particulate contamination of said liquid lubricant in said reservoir, and
f. said second means for said liquid lubricant to be conveyed from said reservoir through said outlet port to said drive chain comprises a lubricant chain applicator made from a durable absorbent material, installed at a location on said motorcycle to cause said lubricant chain applicator to contact said drive chain.

10. A wind driven automatic lubricator for a drive chain of a motorcycle, securable to said motorcycle, comprising:
a. a hollow enclosure defining a reservoir for storing a liquid lubricant, comprising an inlet port and an outlet port,
b. a first means for directing airflow generated by forward motion of said motorcycle into said inlet port of said reservoir, whereby increasing pressure inside of said reservoir while said motorcycle is in forward motion,
c. a second means for conveyance of said liquid lubricant in said reservoir through said outlet port of said reservoir,
d. a discharge conduit, having a first end attached to said outlet port of said reservoir and a second end comprising a third means for delivery of said liquid lubricant to said drive chain, with the highest point of said discharge conduit being located vertically above the natural level of said liquid lubricant in said reservoir, whereby said liquid lubricant flows from said outlet port of said reservoir to said drive chain, only when sufficiently pressurized, and
e. a fourth means for limiting the rate of flow of said liquid lubricant from said reservoir to said drive chain.

11. The wind driven automatic lubricator of claim 10, wherein said reservoir comprises a containment chamber for containing said liquid lubricant and a sealing cap, whereby said sealing cap may be detached from said containment chamber, said liquid lubricant may be replenished, and said reservoir may be re-sealed by replacement of said sealing cap.

12. The wind driven automatic lubricator of claim 11, wherein said containment chamber comprises a fifth means for determination of the level of said liquid lubricant without detaching said sealing cap.

13. The wind driven automatic lubricator of claim 10, wherein said fourth means for limiting the rate of flow of said liquid lubricant from said reservoir to said drive chain is comprised of a passage enclosing a wicking material, whereby the flow rate of said liquid lubricant may be substantially controlled.

14. The wind driven automatic lubricator of claim 10, wherein said wind driven automatic lubricator further includes a fifth means for permitting flow in one direction only into said inlet port of said reservoir, whereby substantially reducing pressure fluctuations in said reservoir.

15. The wind driven automatic lubricator of claim 10, wherein said wind driven automatic lubricator further includes a fifth means for minimizing water contamination of said liquid lubricant in said reservoir.

16. The wind driven automatic lubricator of claim 10, wherein said wind driven automatic lubricator further includes a fifth means for minimizing particulate contamination of said liquid lubricant in said reservoir.

17. The wind driven automatic lubricator of claim 10, wherein said third means for delivery of said liquid lubricant to said drive chain comprises a lubricant chain applicator made from a durable absorbent material, installed at a location on said motorcycle to cause said lubricant chain applicator to contact said drive chain.

18. The wind driven automatic lubricator of claim 10, wherein:
a. said reservoir comprises a containment chamber for containing said liquid lubricant, a sealing cap, and a fifth means for determination of the level of said liquid lubricant without detaching said sealing cap,
b. said fourth means for limiting the rate of flow of said liquid lubricant from said reservoir to said drive chain is comprised of a passage enclosing a wicking material,
c. said wind driven automatic lubricator further includes a sixth means for permitting flow in one direction only into said inlet port of said reservoir,
d. said wind driven automatic lubricator further includes a seventh means for minimizing water contamination of said liquid lubricant in said reservoir,
e. said wind driven automatic lubricator further includes an eighth means for minimizing particulate contamination of said liquid lubricant in said reservoir, and
f. said third means for delivery of said liquid lubricant to said drive chain comprises a lubricant chain applicator made from a durable absorbent material, installed at a location on said motorcycle to cause said lubricant chain applicator to contact said drive chain.

* * * * *